(12) United States Patent
Kubo et al.

(10) Patent No.: US 6,563,886 B1
(45) Date of Patent: May 13, 2003

(54) BIT TIMING SYNCHRONIZATION DEVICE AND A METHOD FOR THE SAME

(75) Inventors: Hiroshi Kubo, Tokyo (JP); Akihiro Okazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/334,725

(22) Filed: Jun. 17, 1999

(30) Foreign Application Priority Data

| Jun. 18, 1998 | (JP) | ............................................. | 10-170939 |
| May 31, 1999 | (JP) | ............................................. | 11-151407 |
| Jun. 15, 1999 | (JP) | ............................................. | 11-168030 |

(51) Int. Cl.$^7$ ................................................. H04L 7/00
(52) U.S. Cl. ........................ 375/326; 375/343; 375/354; 370/503
(58) Field of Search ................................. 375/316, 343, 375/354, 326, 355, 377; 370/503; 327/141

(56) References Cited

U.S. PATENT DOCUMENTS

| 5,140,617 A | 8/1992 | Kubo |
| 5,164,964 A | 11/1992 | Kubo |
| 5,479,450 A | 12/1995 | Okanoue et al. |
| 5,995,571 A | * 11/1999 | Inuzuka ...................... 375/367 |
| 6,181,732 B1 | * 1/2001 | Komatsu ...................... 375/150 |
| 6,212,222 B1 | * 4/2001 | Okubo et al. ................ 375/149 |
| 6,304,619 B1 | * 10/2001 | Citta et al. .................... 375/343 |

FOREIGN PATENT DOCUMENTS

| JP | 856518 | 2/1996 |

OTHER PUBLICATIONS

A. Duel–Hallen et al., "Delayed Decision–Feedback Sequence Estimation," IEEE Transactions on Communications, vol. 37, No. 5, May 1989, pp. 428–436.

G. David Forney, Jr., "Maximum–Likelihood Sequence Estimation of Digital Sequences in the Presence of Intersymbol Interface," IEEE Transactions on Information Theory, vol. IT–18, No. 3, May 1972, pp. 363–378.

* cited by examiner

*Primary Examiner*—Jean Corrielus
(74) *Attorney, Agent, or Firm*—Birch, Stewart, Kolasch & Birch, LLP.

(57) ABSTRACT

Correlation power at each timing is computed, a maximum value of the correlation power is obtained, time sequence is reversed by the time-reverse circuit from the timing at which the maximum value is detected by considering the timing corresponding to the maximum value as a tentative bit timing, correlation power is compared with a threshold value, and a timing at which the correlation power exceeds the threshold value is detected and outputted by a timing detecting circuit as the bit timing.

22 Claims, 21 Drawing Sheets

BIT TIMING SYNCHRONIZATION DEVICE AND A METHOD FOR THE SAME

FIELD OF THE INVENTION

The present invention relates to a bit timing synchronization device and a method for the same applied in a radio communication system such as a car telephone system. More specifically, this invention relates to a bit timing synchronization device and a method for the same for synchronizing bit timing in a channel having a wide delay spread in digital data transmission.

BACKGROUND OF THE INVENTION

FIG. 16 is a block diagram showing a bit timing synchronization device based on the conventional technology. The bit timing synchronization device based on the conventional technology comprises a correlator 3, a power computing circuit 4, a maximum value detecting circuit 5, and an averaging circuit 8.

The correlator 3 is connected to an input terminal 1 for receiving signal and it computes a correlation power between the received signal and a known sequence. The power computing circuit 4 is connected to an output terminal of the correlator 3 and it computes the correlation power. The averaging circuit 8 is connected to an output terminal of the power computing circuit 4 and it computes a moving average according to the correlation power. The maximum value detecting circuit 5 is connected in between an output terminal of the averaging circuit and a bit timing output terminal 2, and it computes a maximum value of the correlation power using the moving average.

Operations of the conventional bit timing synchronization device will be described below. FIG. 17 explains the operations of the bit timing synchronization device based on the conventional technology. In FIG. 17, the horizontal axis indicates timing from t0 to t9, while the vertical axis indicates the correlation power. In the bit timing synchronization device shown in FIG. 16, correlation value between a received signal and a known sequence is computed by the correlator 3, and the correlation power is computed by the power computing circuit 4.

In the example shown in FIG. 17, delay spread due to a multi-path is regarded as one bit, and the optimal bit timing is at the timing t3. Herein it is assumed that the maximum-likelihood sequence estimation (MLSE), which is an equalizer capable of treating a delay, for instance, up to 1 bit is applied herein (As for the MLSE, refer to G. D. Forney, Jr.: "Maximum-likelihood sequence estimation of digital sequences in the presence of intersymbol interference", IEEE Trans. Inform. Theory, vol. IT-18, 3, pp. 363–378, May 1972).

When the timing corresponding to the maximum value of correlation power is detected as the bit timing there occurs a problem in the bit timing synchronization device based on the conventional technology that a delay wave having a power level higher than the power level of the direct wave is disadvantageously treated as the bit timing.

To solve this problem, a moving average for 2-bit width is computed by the averaging circuit 8. FIG. 18 shows output from the averaging circuit 8. In FIG. 18, the value corresponding to the timing t2 is a value obtained by adding the values corresponding to the timings t2 and t3 shown in FIG. 17. Similarly, the value at the timing t3 is the value obtained by adding the values at the timings t3 and t4. In FIG. 18, the maximum value is at the timing t3, and this timing does not change even if the value of the direct wave (at timing t3 in FIG. 17) and the delayed wave (at timing t4 in FIG. 17) changes.

On the other hand, when a delay time of a delayed wave becomes longer, the MLSE is not practical for solving the problem due to its circuit complexity. In such a case, the decision-feedback sequence estimation (DFSE) which is a simplified MLSE technique is used (As for the DFSE, refer to A. Duel-Hallen and C. Heegard: "Delayed decision-feedback sequence estimation", IEEE Trans. Commun., vol. COM-37, 5, pp. 428–436, May 1989). However, when the DFSE is used there occurs a problem that only signals around bit timing can be used.

Herein it is assumed, for instance, that the DFSE capable of treating a delay of up to 3 bits is used and the moving average value is 4 bits. FIG. 19 shows a case where the moving average value is 4 bits. As shown in FIG. 19, there is a possibility that any of the three timings t1, t2, or t3 may be detected as the bit timing. When the timing t3 is selected as bit timing, because the DFSE can utilize a signal around this bit timing t3 an excellent performance can be obtained. However, if the timing t2 or t1 are detected as the bit timing the performance of the DFSE becomes worse.

Thus, when width utilized for calculating the moving average is too wide the performance degrades. Therefore, as shown in FIG. 20, when the delayed wave is delayed by 5-bit then width utilized for calculating the moving average is set to 4 bits. The moving average output in this case is shown in FIG. 21. In FIG. 21, the moving average has a maximum value at the timings t5, t6, t7 and t8, so that the timing t3 which is the optimal bit timing is not selected.

As described above, with the bit timing synchronization device based on the conventional technology, when the applied equalizer is MLSE, it is possible to supply excellent bit timing. However, when a sub-optimal DFSE is used, there occur, for instance, the following problems:

(1) ambiguity occurs in the bit timing detected according to a moving average and a desirable bit timing can not be detected, and (2) when the width for obtaining the moving average is narrow, bit timing is synchronized to that of a delayed wave when signal power of the delayed wave is large, and these problems make it impossible to supply acceptable bit timing.

SUMMARY OF THE INVENTION

It is an object of the present invention to provide a bit timing synchronization device which can realize high precision bit timing in a channel having a wide delay spread and a method for the same.

In the present invention, a maximum value detecting means detects a maximum value of the correlation power within a pre-determined time-range. Then, a bit timing detecting means considers this detected timing corresponding to the maximum value of the correlation power as a tentative bit timing and further, detects a timing within the pre-determined time-range and prior to this tentative bit timing at which the correlation power is equal to or more than a correlation power which can be set as desired as the bit timing for the operation of the demodulator. Thus, even if the power of the direct wave is smaller than the power of the delayed wave, bit timing for starting the operation of the demodulator can be detected from the timing of the direct wave.

In the present invention, a correlation between a received signal and a known sequence and the power of this correlation is computed. Then, a maximum value of the power within a pre-determined time-range and the timing corresponding to that maximum value of the power is computed. Timing within the pre-determined time-range is reversed to the past considering the timing corresponding to the maximum value of the power as the starting point. The correlation power successively outputted corresponding to the inverted timing is compared with a threshold value which is less that the maximum value, and a timing which is the oldest timing within the pre-determined time-range at which the value of the correlation power is larger than the threshold value is detected as the bit timing for starting the operation of the demodulator. Thus, even if the power of the direct wave is smaller than the power of the delayed wave, bit timing for starting the operation of the demodulator can be detected from the timing of the direct wave.

In the present invention, a maximum value of the correlation power within a pre-determined time-range is detected. Then, this detected timing corresponding to the maximum value of the correlation power is considered as a tentative bit timing and further, a timing within the pre-determined time-range and prior to this tentative bit timing at which the correlation power is equal to or more than a threshold value which can be set as desired is detected as the bit timing for the operation of the demodulator. Thus, even if the power of the direct wave is smaller than the power of the delayed wave, bit timing for starting the operation of the demodulator can be detected from the timing of the direct wave.

Other objects and features of this invention will become understood from the following description with reference to the accompanying drawings.

DESCRIPTION OF THE PREFERRED EMBODIMENTS

Detailed description is made hereinafter for the preferred embodiments of a bit timing synchronization device and a method for the same according to the present invention with reference to the attached drawings.

At first, configuration of the bit timing synchronization device according to the present invention will be described.

Figure 1:
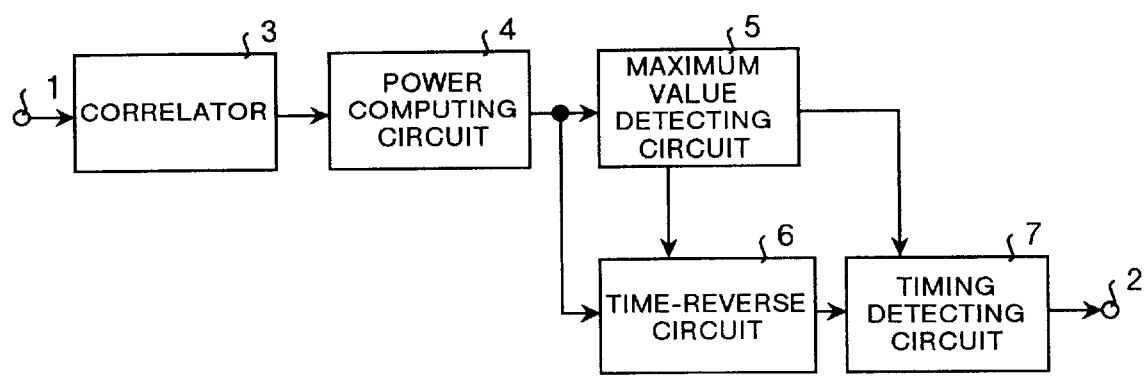
FIG. 1 is a block diagram showing an example of the configuration of a bit timing synchronization device according to Embodiment 1 of the present invention.

FIG. 1 is a block diagram showing an example of the configuration of the bit timing synchronization device according to Embodiment 1 of the present invention. The bit timing synchronization device according to Embodiment 1 comprises, as shown in FIG. 1, a correlator 3, a power computing circuit 4, a maximum value detecting circuit 5, a time-reverse inverting circuit 6, and a timing detecting circuit 7. It should be noted that the configuration of the correlator 3, the power computing circuit 4, and the maximum value detecting circuit 5 is the same as that of the conventional type of configuration described above, therefore, the same reference numerals are assigned to these components, and description thereof is omitted herein. Furthermore, functions of the correlator 3, the power computing circuit 4, and the maximum value detecting circuit 5 are the same as that in the case based on the conventional technology.

The time-reverse circuit 6 inverts a time from a certain timing to a timing which is prior to the certain timing and outputs the correlation power at each timing. The timing detecting circuit 7 detects the bit timing by comparing the correlation power input by the time-reverse circuit 6 with a threshold value, and outputs the detected bit timing through a bit timing output terminal 2. A value obtained by multiplying the maximum correlation power by, for example, 1/N where N is a natural number is set as the threshold value by the timing detecting circuit 7. The value of N may be kept fixed or the value may be changed according to the transmission conditions.

Figure 2:
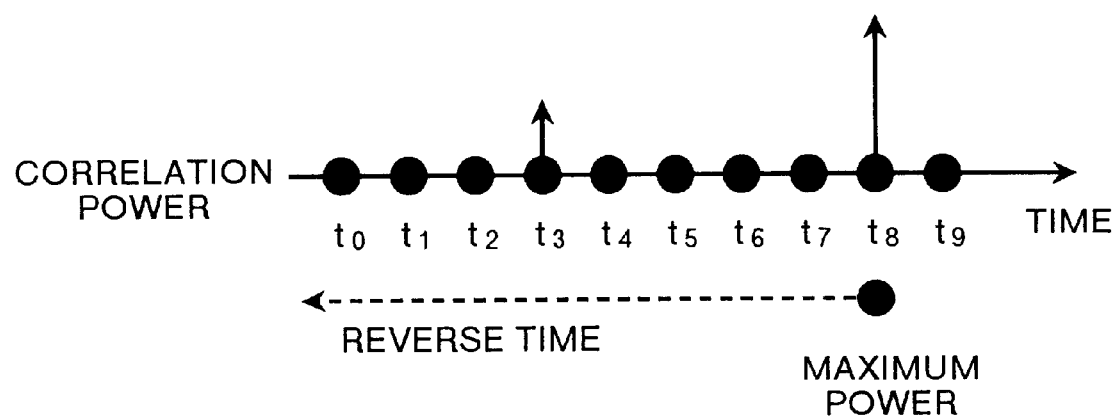
FIG. 2 explains an example of an operation of the bit timing synchronization device according to Embodiment 1.
Figure 20:
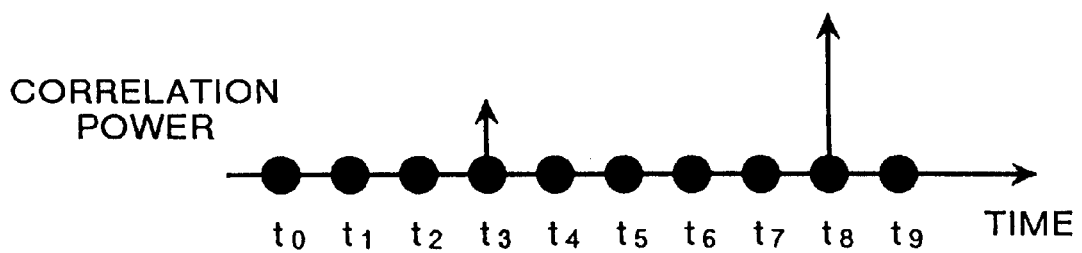
FIG. 20 is a view for explaining still another operation of the bit timing synchronization device based on the conventional technology.
Figure 21:
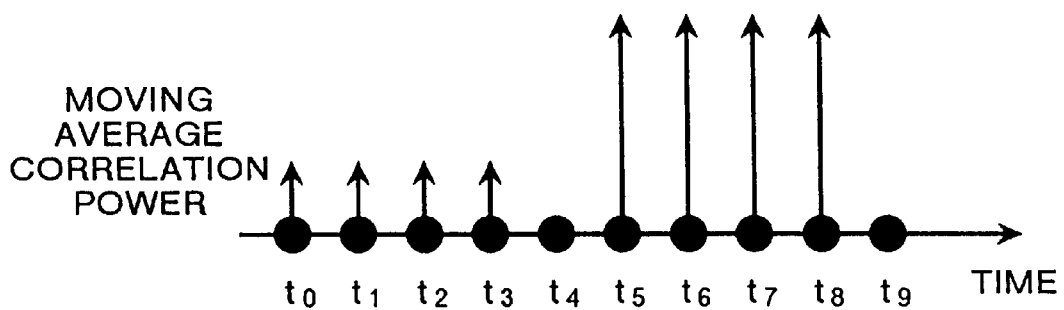
FIG. 21 is a view for explaining still another operation of the bit timing synchronization device based on the conventional technology.

Next, description is made for an over all operation with the help of an example by referring to the pattern in FIG. 2 which is the same pattern as the correlation power pattern shown in FIG. 20. In the example of FIG. 2, delay spread due to a multi-path is 5 bits, and optimal bit timing is t3. At first, the correlator 3 computes a correlation power between the received signal and a known sequence, and the power computing circuit 4 computes the correlation power. The DFSE capable of processing up to 5 bits may be utilized as the equalizer.

Then, the maximum value detecting circuit 5 selects the timing t8 as the tentative bit timing. The time-reverse circuit 6 inverts the time from the timing t8 up to the timing t0 and outputs the correlation power correspond to each timing. The timing detecting circuit 7 connected to this time-reverse circuit 6 in the next stage therefrom compares the inputted correlation power with the threshold value.

When the inputted correlation power is equal to or more that the threshold value, the tentative bit timing is updated to the timing corresponding to this correlation power. Namely, when there is a direct wave before the timing t8, the timing corresponding to the direct wave is considered as the tentative bit timing. The comparison of the powers is repeated, and at the last timing t0 the timing remaining as the tentative bit timing is outputted as the bit timing in a demodulator. In FIG. 2, assuming that the threshold value is set to ¼ of the maximum correlation power, the timing t3 is outputted as the final bit timing. Although the threshold value is taken as ¼ of the maximum correlation power, it is not limited that the threshold value is ¼ of the maximum correlation power, but any other value may be considered depending on noise or the like.

In the example of FIG. 2, the oldest tentative bit timing in time range within the period of time from the timing t0 to t9, to be exact, the period of time from the timing t0 to t8, namely the timing t3 is decided as the bit timing in the demodulator. Therefore, even if a power of the direct wave (timing t3) is smaller than that (a power) of the delayed wave (timing t8), the bit timing in the demodulator can be detected with high precision according to timing for a direct wave.

As described above, with Embodiment 1 a maximum value of the correlation power obtained within a pre-determined time-range is detected, this timing is considered as tentative bit timing, a timing within the pre-determined time-range and prior to this tentative bit timing at which the correlation power is equal to or more than a given correlation power is detected as the bit timing for the operation of the demodulator. Therefore, even when the power of the direct wave is smaller than the power of the delayed wave, the bit timing for the operation of the demodulator can be detected with a high precision from the direct wave timing. Thus, high-precision bit timing is realized in a channel having a wide delay spread.

Furthermore, bit timing within a pre-determined time-range at which the correlation power is equal to or more than a correlation power which can be set as desired is detected by going back to the past from the tentative bit timing as the starting point, so that a case where a delayed wave has a larger value than that of a direct wave in the correlation powers for the direct wave and the delayed wave obtained in this order can be dealt with. With this feature, it is possible to prevent incorrect synchronization with a delayed wave and realize accurate synchronization with a direct wave.

In addition, the desired correlation power is set to a value larger than 1/N of the maximum value, therefore, signals which are at the noise level can be removed.

Although bit timing has been detected without using processing of averaging in Embodiment 1 described above, the present invention is not limited to the above configuration. Bit timing may be detected including the processing of averaging like Embodiment 2 described below.

Figure 3:
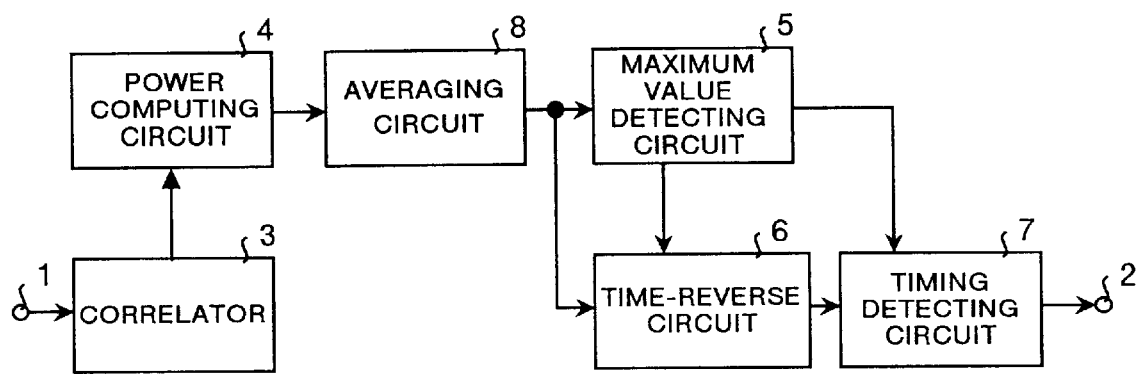
FIG. 3 is a block diagram showing an example of the configuration of a bit timing synchronization device according to Embodiment 2 of the present invention.

Configuration of the bit timing synchronization device according to Embodiment 2 of the present invention will be explained below. FIG. 3 is a block diagram showing an example of the configuration of a bit timing synchronization device according to Embodiment 2 of the present invention. The bit timing synchronization device according to Embodiment 2 comprises, as shown in FIG. 1, a correlator 3, a power computing circuit 4, a maximum value detecting circuit 5, a time-reverse circuit 6, a timing detecting circuit 7, and an averaging circuit 8.

It should be noted that the configuration of the correlator 3, the power computing circuit 4, the maximum value detecting circuit 5, and the averaging circuit 8 is the same as that of the conventional type of configuration described above, therefore, the same reference numerals are assigned to these components, and description thereof is omitted herein. Furthermore, functions of the correlator 3, the power computing circuit 4, the maximum value detecting circuit 5, and the averaging circuit 8 is the same as that of the example based on the conventional technology. The configuration in this embodiment is different in a point that the averaging circuit 8 is added thereto from the configuration in above mentioned Embodiment 1.

Next description is made for the operation. The basic operation, namely each operation excluding that of the averaging circuit 8 is the same as that in Embodiment 1 described above. Herein, by providing the averaging circuit 8 between the power computing circuit 4 and the maximum value detecting circuit 5, it can be avoided that a delayed wave at a higher power level may be regarded as bit timing even when a maximum value of the correlation power is decide as bit timing, and this does not change even if a power of correlation between the direct wave and delayed wave is changed.

As described above, with Embodiment 2, by adding the averaging circuit 8 thereto, uncertainty of bit timing occurs by 1 bit assuming that a width of moving average in the averaging circuit 8 is 2 bits, but this processing of averaging makes it possible to suppress the influence over the bit timing due to the noise.

In the Embodiment 3, synchronization with bit timing and at the same time synchronization with frame timing is obtained in the above mentioned bit timing synchronization device. The bit timing in this embodiment is the timing for sampling a symbol of a received signal in the same way as in the Embodiments 1 and 2, while the frame timing is a timing for roughly obtaining the synchronization of the frames included in the received signal.

In the bit timing synchronization device in Embodiments 1 and 2, assuming that frame timing is known, bit timing is detected by regarding this known frame timing as the reference. However, in generally, frame timing is first detected from the continuously transmitted signals, and then bit timing is detected. Detection of the frame timing is realized by providing a timing detecting circuit in a stage previous to the maximum value detecting circuit in the bit timing synchronization device.

Figure 4:
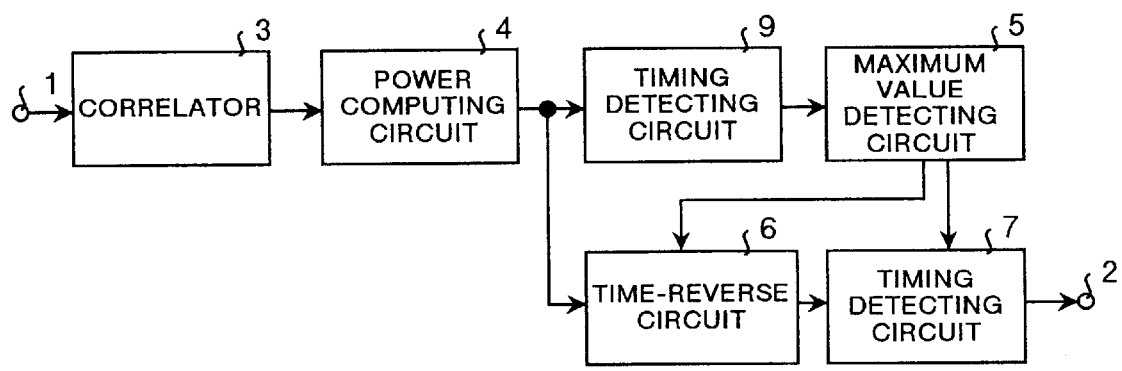
FIG. 4 is a block diagram showing an example of the configuration of a bit timing synchronization device according to Embodiment 3 of the present invention.

FIG. 4 is a block diagram showing an example of the configuration of a bit timing synchronization device according to Embodiment 3 of the present invention. In the bit timing synchronization device according to the present invention a timing detecting circuit 9 which detects the timing but in which a time range for timing detection is not limited is provided in a stage previous to the maximum value detecting circuit 5 in Embodiment 1 described above. In this timing detecting circuit 9, a threshold value is set to an appropriate value. Some of the other components in the configuration are the same as those in Embodiment 1, so that the same reference numerals are assigned to them and description thereof is omitted herein.

Next description is made for the operation. In this embodiment, because the frame timing is not known, all of the inputted received signals become the target for obtaining the correlation. In the bit timing synchronization device, the correlator 3 obtains a correlation power at each timing, and then the power computing circuit 4 computes the correlation power.

The timing detecting circuit 9 compares the correlation power outputted at each timing with a threshold value which can be set as desired, and detects a timing at which the correlation power exceeds the threshold value. The maximum value detecting circuit 5 provided in the next stage detects, regarding this timing as a reference, a maximum value in the pre-determined time-range, and outputs the maximum value. The time-reverse circuit 6 and the timing detecting circuit 9 provided in the stages thereafter are the same as those in Embodiment 1 and description thereof is omitted herein.

It is assumed that the correlation power between a known sequence and a received signal including the known sequence may be larger than the correlation power between the known sequence and a received signal without the known sequence. Therefore, a threshold value used in the timing detecting circuit 9 is set to be larger than the correlation power between the known sequence and a received signal without the known sequence. Namely, at the point of time at which the correlation power between a known sequence and a received signal without the known sequence is computed, the correlation power will never exceed the threshold value and a correlation power at the next point of time can be acquired. Conversely, when correlation is computed at the timing of a received signal including a known sequence, the correlation power exceeds the threshold value and the frame timing is detected. Then, the processing shifts to the next step where bit timing is detected.

Thus, it is possible to detect a position of a received signal including a known sequence as an output timing in the timing detecting circuit 9. However, the threshold value in the timing detecting circuit 9 relatively changes due to the power of the received signal, therefore, a value obtained by multiplying the power of the received signal by a constant is set as the threshold value.

As described above, with this embodiment, a timing detecting circuit with an appropriate threshold value set therein without any restriction of a time range for timing detection is provided in the previous step of detecting a maximum value, thus frame timing can be acquired along with the bit timing.

The present invention improves the characteristics of timing detection by adding an averaging circuit to the bit timing synchronization device according to Embodiment 3 and detecting the frame timing and the bit timing based on this configuration. Especially, when detecting the frame timing, comparison with the threshold value is performed for all the received signals, therefore, excellent effect is obtained by using the averaging circuit capable of suppressing noise.

Figure 5:
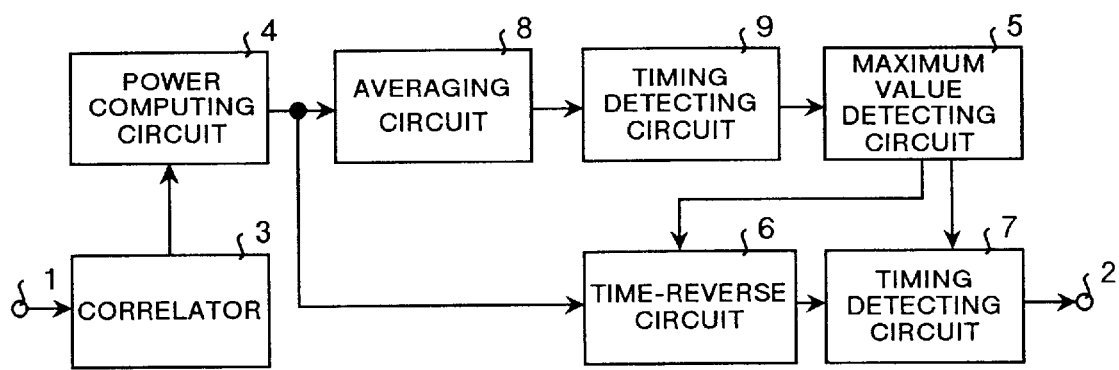
FIG. 5 is a block diagram showing an example of the configuration of a bit timing synchronization device according to Embodiment 4 of the present invention.

FIG. 5 is a block diagram showing an example of the configuration of a bit timing synchronization device according to Embodiment 4 of the present invention. The bit timing synchronization device according to the present invention is characterized in that an averaging circuit 8 is provided between the power computing circuit 4 and the timing detecting circuit 9. This averaging circuit 8 is the same as that described in Embodiment 2, therefore, description of specific configuration and operation is omitted herein.

In this embodiment, each correlation power obtained by the power computing circuit 4 is averaged by the averaging circuit 8. Noise is suppressed because of the processing in this averaging circuit 8. In addition, the timing detecting circuit 9 detects the frame timing using the averaged correlation power, so that a probability of detection of incorrect frame timing can be suppressed.

The probability of detection of the frame timing herein is a probability in a case where the correlation power and the above mentioned threshold value are compared with each other once, therefore, in a case where the threshold value is compared with all of the received signals any number of times until timing is detected like detection of frame timing, the probability for incorrect detection of a frame tends to increase. Therefore, the effect of suppression of noise by averaging is validated especially in detection of frame timing.

Furthermore, in this embodiment, after the timing detecting circuit 9 detects the frame timing, the maximum value detecting circuit 5 computes, as tentative bit timing, timing corresponding to the maximum value of correlation power within the pre-determined time-range. By using the averaged correlation power like that in detection of frame timing as an input to this maximum value detecting circuit 5 noise can also be suppressed.

Then, the time-reverse circuit 6 outputs the correlation power prior to the tentative bit timing detected by the maximum value detecting circuit 5 by going back to the past within the pre-determined time-range. Then bit timing detecting circuit 7 compares the outputted correlation power with the previously set threshold value, and outputs the earliest timing among timings at which the computed correlation power exceeds the threshold value as final bit timing.

When the average correlation power outputted from the averaging circuit 8 is used as an input to the time-reverse circuit 6, noise suppressing effect can be obtained similarly to that of Embodiment 2, but at the same time uncertainty of timing may occur. The uncertainty is included in the final bit timing, because of which precision of the bit timing is degraded. Therefore, in this embodiment, in view of the fact that a time zone for going back to the past especially in the time-reverse circuit 6 is comparatively small, correlation power that is not averaged as output from the power computing circuit 4 is used for input to the time-reverse circuit 6. Therefore, in this embodiment, high-precision bit timing without uncertainty in timing can be obtained.

As described above, with this embodiment, an averaged correlation power in the averaging circuit 8 is inputted only to the timing detecting circuit 9, while the correlation power by the power computing circuit 4 whose average is not computed is inputted into the time-reverse circuit 6, so that noise suppressing effect can be obtained in detection of the frame timing. With this feature, the probability of detection of incorrect timing can be suppressed, and high-precision bit timing without uncertainty in timing can be obtained in detection of the final bit timing. In this embodiment, although the case including detection of frame timing has been used, the present invention is also effective in the configuration with no timing detecting circuit 9 provided therein, thus the above case not being excluded from the scope of the present invention.

In Embodiment 5, timing for a delayed wave is obtained concurrently with synchronization with bit timing in the above mentioned bit timing synchronization device. Thus, as timing for a direct wave and that for a delayed wave can be detected, a time difference between the direct wave and delayed wave can be estimated. Then, by using the estimated time difference therebetween, an applied equalizer, for example, can effectively be configured.

For example, in the bit timing synchronization device according to Embodiment 1, by detecting the temporary bit timing in the maximum value detecting circuit 5 and then going back to the past by the time-reverse circuit 6, bit timing is computed in the timing detecting circuit 7. Therefore, this bit timing becomes timing of the direct wave. In this embodiment, by detecting the timing for a direct wave and then searching a pre-determined time-range again in the forward direction, timing for the newest, namely the latest delayed wave is detected.

Figure 6:
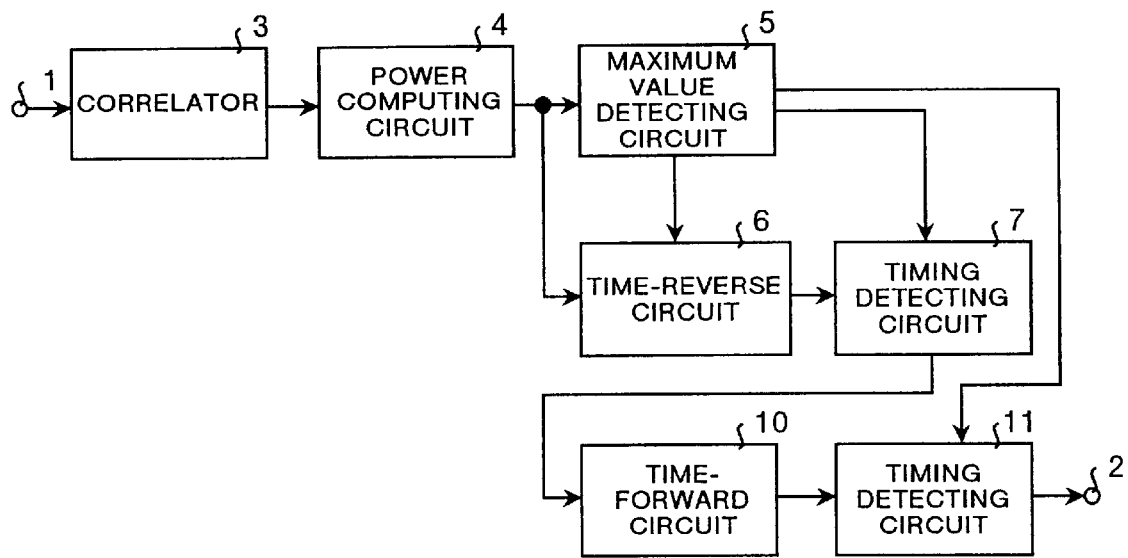
FIG. 6 is a block diagram showing an example of the configuration of a bit timing synchronization device according to Embodiment 5 of the present invention.

FIG. 6 is a block diagram showing an example of the configuration of a bit timing synchronization device according to Embodiment 5 of the present invention. The bit timing synchronization device according to the present invention has a configuration in which a time-forward circuit 10 and a timing detecting circuit 11 added to the bit timing synchronization device of Embodiment 1. As the direction described below, a forward direction, namely a direction from a current time further to a received signal in future is regarded as a forward direction and a direction going back to the past in the lapse of time, namely a direction to a received signal in the past is regarded as a backward direction.

The time-forward circuit 10 successively outputs a correlation power within the pre-determined time-range in the forward direction starting from the bit timing detected in the timing detecting circuit 7. Then, the timing detecting circuit 11 compares the prespecified threshold value with the correlation power outputted from the time-forward circuit 10, and outputs a latest bit timing corresponding to the correlation power the threshold value within a pre-determined time-range as the bit timing for a delayed wave.

Figure 7:
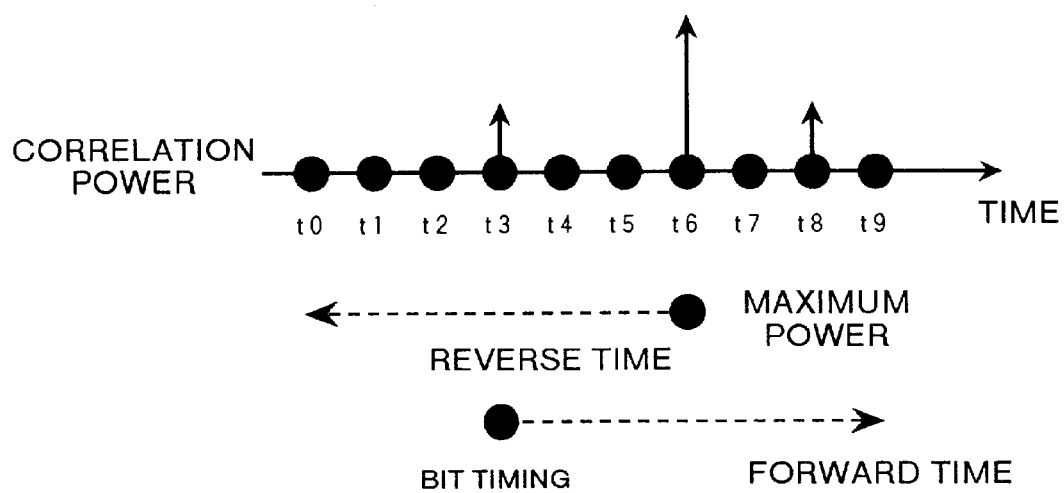
FIG. 7 is a view showing a pattern of the correlation power.

Next description is made for an over all operation with the help of an example while referring to the correlation power pattern shown in FIG. 7. As the equalizer, the DFSE capable of processing up to 5 bits used in the conventional technology is used. Therefore, a period of time in the time-reverse circuit 6 and time-forward circuit 10 is 6. In the example in FIG. 7, it is assumed that delay spread due to a multi-path is 5 bits, optimal bit timing and timing for the direct wave is the timing t3, and the timing for the delayed wave is the timing t8.

In this embodiment, at first the maximum value detecting circuit 5 selects the timing t6 as temporary bit timing, and then the time-reverse circuit 6 outputs a correlation power for a range from the timing t6 to t0. Then, the timing detecting circuit 7 in which the threshold value is decided, for instance, ¼ of the maximum correlation power receives this correlation power and outputs the timing t3 as the bit timing.

Then, the time-forward circuit 10 outputs a correlation power at each of the timing t3 up to t9, and the timing detecting circuit 11 having received the output compares the correlation power with the threshold value, and outputs a latest timing at which the value exceeds the threshold value as timing for the delayed wave. For example, when the threshold value is ¼ of the maximum correlation power similarly to the timing detecting circuit 7, the timing for the delayed wave becomes t8.

As described above, with this embodiment, timing for the delayed wave is obtained concurrently with the bit (direct wave) timing. Therefore, a time difference between a direct wave and a delayed wave can easily be estimated. Although the embodiment has configuration with the time-forward circuit 10 and timing detecting circuit 11 added to the configuration in Embodiment 1, the same effect can be obtained even when the components described above are added to the configuration described in any of Embodiments 2 to 5.

If there is frequency deviation larger than an allowable range in the bit timing synchronization device in a received signal, detection capability is largely degraded. Therefore, the present invention has been made for the purpose of obtaining correct bit timing when frequency deviation larger than an allowable range is included in a received signal in the bit timing synchronization device.

More specifically, in the bit timing synchronization device according to Embodiments 1 to 5, for example, when the phase of the received signal is rotated due to frequency deviation or the like in time base, a probability of obtaining a desired timing is largely reduced. That is because a signal changes in a zone synthesized by the correlator 3 and a correlation power outputted with the change is reduced so that an S/N ratio is degraded and the correlation power does not exceed the threshold value in the specified timing.

Therefore, in this embodiment, a fixed frequency deviation compensating device for outputting a received signal obtained by subjecting a prespecified frequency to frequency deviation compensation and a bit timing synchronization device for receiving the received signal subjected to the frequency deviation compensation and outputting bit timing are integrated to one unit, and further, by operating in parallel a plurality of units each with a frequency deviation compensation value set to a different value, bit timing is synthesized from the units to obtain a specified timing.

Figure 8:
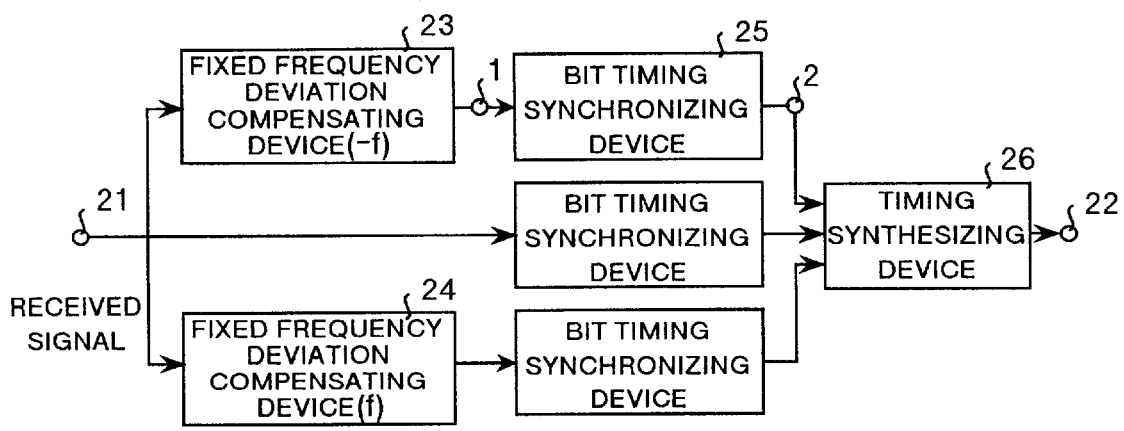
FIG. 8 is a block diagram showing an example of the configuration of a bit timing synchronization device according to Embodiment 6 of the present invention.

FIG. 8 is a block diagram showing an example of the configuration of a bit timing synchronization device according to Embodiment 6 of the present invention. In the bit timing synchronization device according to the present invention, the bit timing synchronization device 25 in FIG. 8 corresponds to, for instance, the bit timing synchronization device according to Embodiments 1 to 5. In this embodiment, three bit timing synchronization devices are provided in parallel, and output from fixed frequency deviation compensating devices 23, 24 or a received signal 21 are inputted thereinto respectively. Namely, a frequency deviation compensation value −f, 0 (not rotated), or a signal obtained by rotating f to the received signal are inputted in each of the bit timing synchronization devices 25. Then, each output from the bit timing synchronization devices 25 is inputted into a timing synthesizing device 26, and the timing synthesizing device 26 synthesizes each output bit timing from the bit timing synchronization devices 25 and outputs the synthesized bit timing.

Although each fixed frequency deviation compensation value of the fixed frequency deviation compensating devices 23 and 24 can be set as desired, it is set within an allowable range of frequency deviation for obtaining a correct timing in the bit timing synchronization device 25. Further, although a synthesizing method in the timing synthesizing device 26 may be set as desired, for instance, output from each of the bit timing synchronization devices 25 is added and a timing at which the value exceeds the prespecified threshold value is recognized as output bit timing.

As the timing synthesizing device 26, a device described below may be utilized. For example, when the bit timing synchronization device 25 has a unit for detecting whether output is correct or incorrect provided therein, the timing synthesizing device 26 selects the correct timing by receiving the correct information therefrom. Furthermore, in this embodiment, although a plurality of bit timing synchronization devices 25 are provided to perform the operation in parallel, for example, a configuration in which the operation is performed serially may be employed. For example, bit timing may be detected by the fixed frequency deviation compensating device 23 as well as one bit timing synchronization device 25, and when a correct bit timing is not detected, the bit timing is detected again by using the other fixed frequency deviation compensating device 24 and a bit timing synchronization device 25.

Then, the operation is described. For example, it is assumed that a frequency deviation $\Delta f1$ is included in a received signal. In such a case, when the fixed frequency deviation compensating devices 23 and 24 are not provided, input to the bit timing synchronization device 25 becomes a received signal which includes the frequency deviation $\Delta f1$. In contrast, a received signal with frequency deviation $\Delta f+\Delta f1$ is inputted into the bit timing synchronization device 25 when the frequency deviation compensating device having a fixed frequency $\Delta f$ provided therebefore, and when $\Delta f1$ or $\Delta f+\Delta f1$ is included in an allowable range of the bit timing synchronization device, for example, bit timing can correctly be detected. Namely, assuming that a frequency deviation allowable range of the bit timing synchronization device is $\pm \Delta F$, the configuration in this embodiment shown in FIG. 8 can be provided for frequency deviation of $-\Delta f \pm \Delta F$, $\pm \Delta F$, and $\Delta f \pm \Delta F$.

As described above, with this embodiment, even when frequency deviation beyond the allowable range in the bit timing synchronization device 25 is included in a received signal 21, by using the configuration in FIG. 8, correct bit timing can be detected.

The correlator 3 in Embodiments 1 to 6 performs most of the computations in the bit timing synchronization device according to the present invention, and herein, the correlator 3 computes correlation between the known sequence and a received signal as described above. The present invention has been made for the purpose of largely reducing an amount of computation in the correlator, for example, when a sequence with a certain basic pattern repeated a plurality of times is used as the known sequence for computing this correlation. Namely, in this embodiment, the amount of computations performed by the correlator 3 when the known sequence with a basic pattern repeated n times (n: integer) is used can be reduced to substantially 1/n. As a basic pattern of a known sequence as a condition, there is a sequence with sharp auto-correlation characteristic singly used as a known sequence, and more specifically, there is a maximum-length sequence (described "M sequence" hereinafter).

Figure 9:
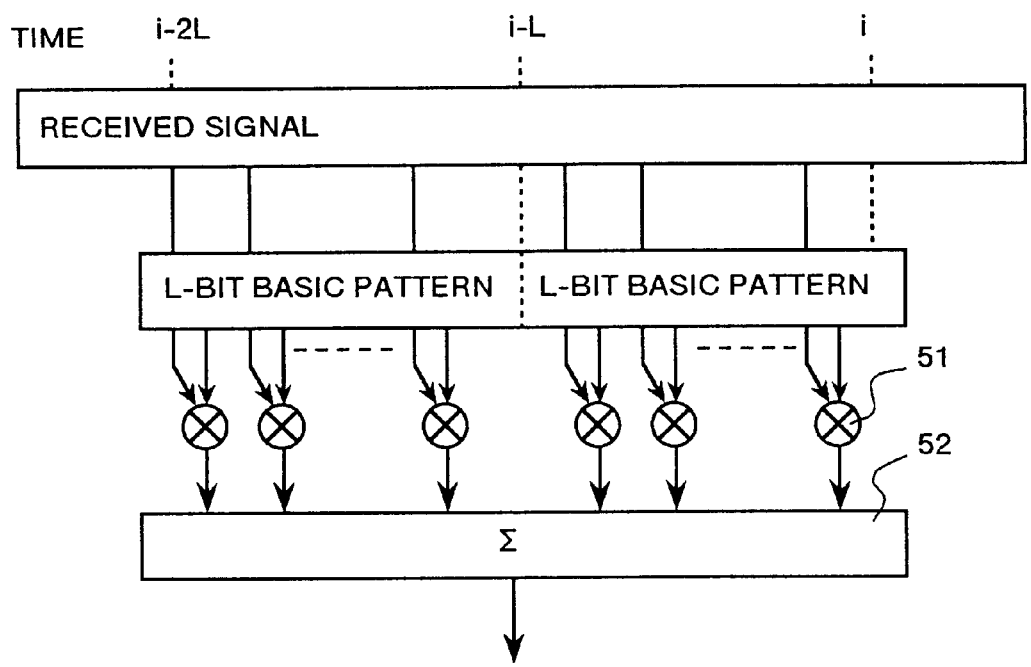
FIG. 9 shows the configuration of a correlator based on the conventional technology.

FIG. 9 is a view showing configuration of a correlator based on the conventional technology. Herein, there is used a correlator to a known sequence whose entire sequence length is 2L where two patterns, assuming that a sequence length of a basic pattern is L, are repeated. For example, in this correlator, a multiplier 51 computes each product of a 2L-bit received signal from the timing i up to the timing i−2L and a known sequence with a sequence length 2L, and a synthesizer 52 obtains a total sum of the products, namely a correlation power. It should be noted that this processing has to be performed at each timing when correlation is to be computed.

Figure 10:
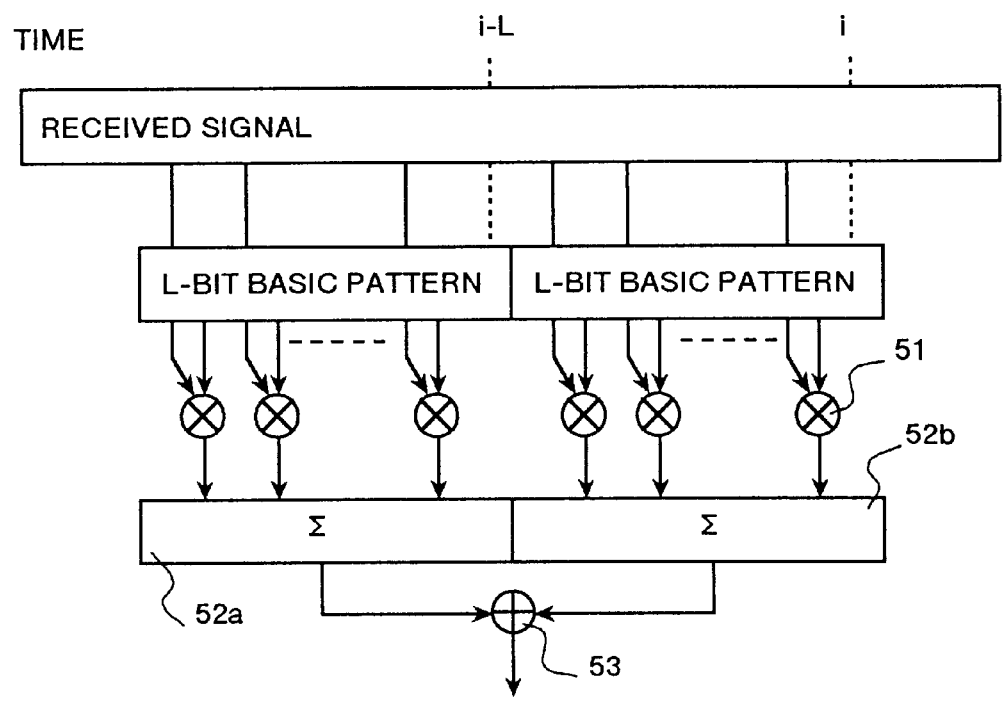
FIG. 10 shows the configuration of a correlator equivalent to that of FIG. 9.

FIG. 10 is a view showing configuration of a correlator equivalent to that of FIG. 9. This configuration uses two correlators each with a basic pattern that has a sequence length of L bit, and a multiplier 51, synthesizers 52a and 52b perform L-bit correlation processing at the timing i and perform L-bit correlation processing at the timing i−L, and finally, an adder 53 computes a sum of the correlation powers, thus output equal to that from the correlator shown in FIG. 9 is obtained.

Figure 11:
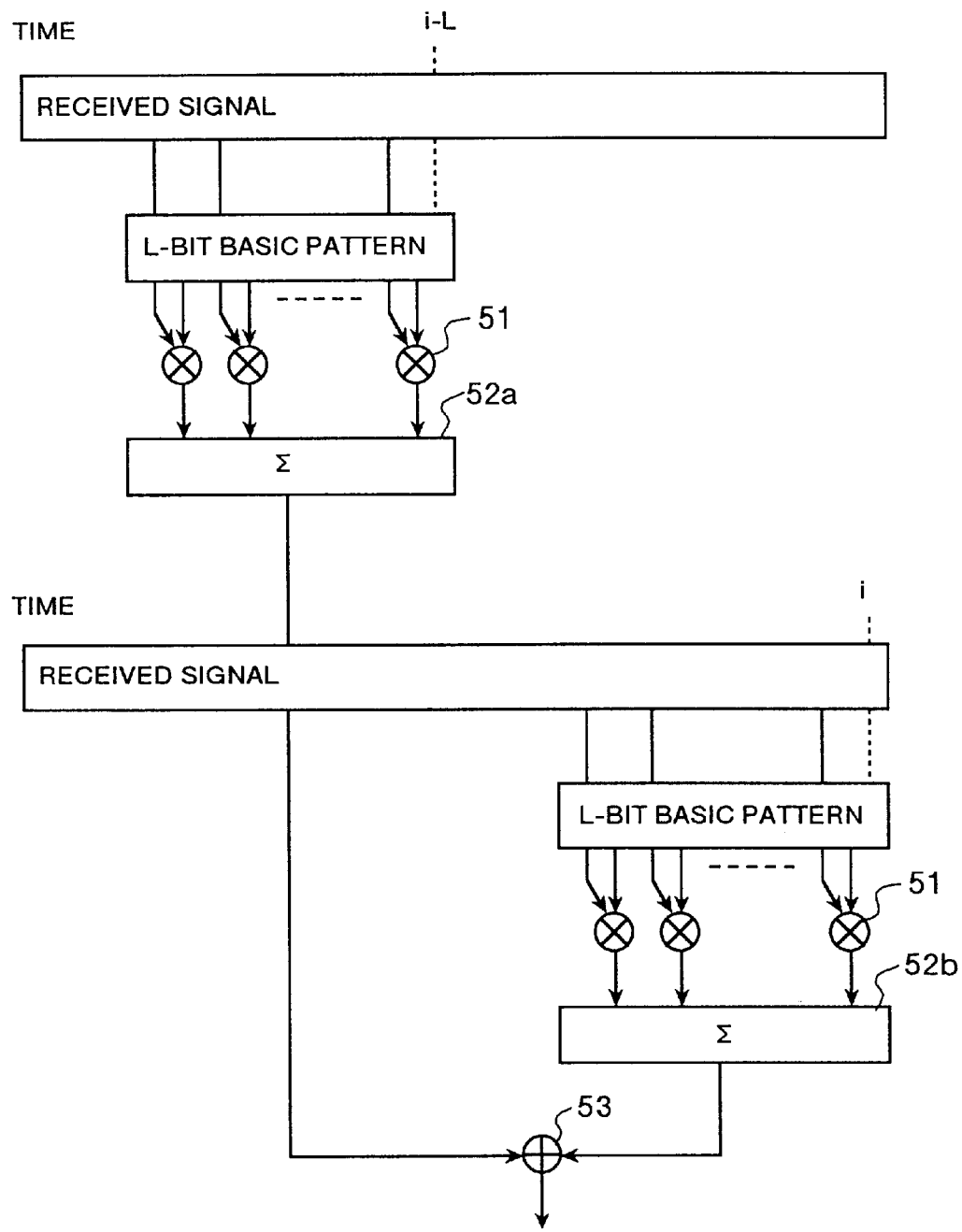
FIG. 11 shows the configuration of a correlator equivalent to that of FIG. 10.

However, assuming that the correlation power is computed at each timing, the output in FIG. 10 is equal to the sum of an L-bit correlation power at timing i−L and an L-bit correlation power at the timing i shown in FIG. 11. Namely, by storing the correlation power in the past by L-bit once, the correlation processing at each timing is sufficient with L bit.

Figure 12:
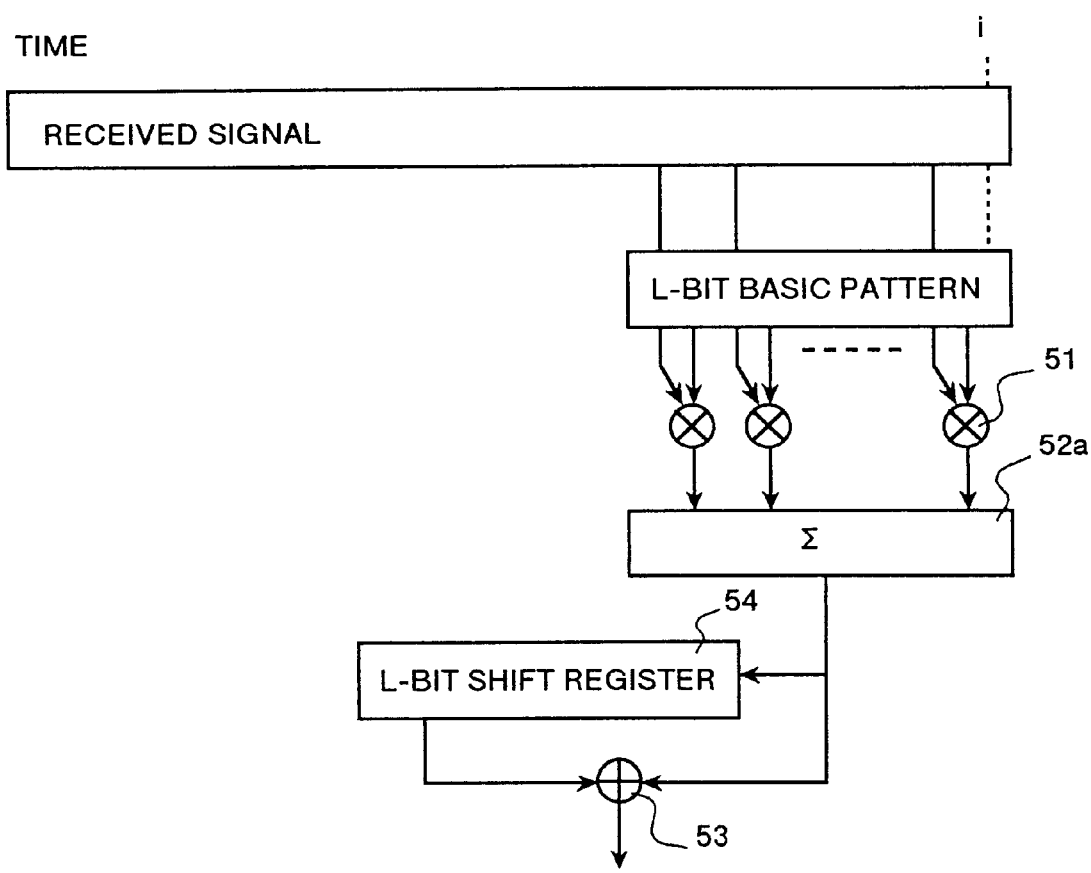
FIG. 12 shows the configuration of a correlator according to the present invention.

FIG. 12 is a view showing configuration of the correlator according to the present invention. In this embodiment, the multiplier 51 and synthesizer 52a acquire a correlation power to an L-bit basic pattern at each timing respectively, and the output therefrom is inputted into an L-bit shift register 54. Then, the adder 53 computes a sum of the current correlation power and an output value from the L-bit shift register 54 (a correlation power in the past by L bit) and outputs a result of the computation as a correlation power. As described above, in this embodiment, the L-bit multiplier 51, L-bit synthesizer 52a, L-bit shift register 54, and one unit of adder 53 are provided, which constitutes a correlator enabling reduction in the amount of computations. Even when n-pieces, equal to or more than two, of basic patterns are used as a known sequence, a shift register for storing therein correlation power and an adder for adding the stored values are provided, which can constitute an nL-bit correlator.

As shown in Embodiment 6, a signal in a zone synthesized by the correlator 3 changes and a correlation power outputted in association with the change is reduced, therefore, an S/N ratio is degraded and a probability for obtaining correct bit timing is reduced. This is because coherent synthesis is performed based on assumption that there occurs no phase change in all the zones where synthesis is made by correlation. A zone where this coherent synthesis is performed is called a width of coherent synthesis hereinafter.

In the present invention, when a sequence where a basic pattern is repeated a plurality of times is used as a known sequence for computing correlation, the width of coherent synthesis in the correlator is reduced. Reduction of the width of coherent synthesis means realization of a bit timing synchronization device having durability against change, which enlarges an allowable range of frequency deviation in the bit timing synchronization device. It should be noted that the assumed known sequence is the same as that in Embodiment 7 described above, therefore, description thereof is omitted herein.

Figure 13:
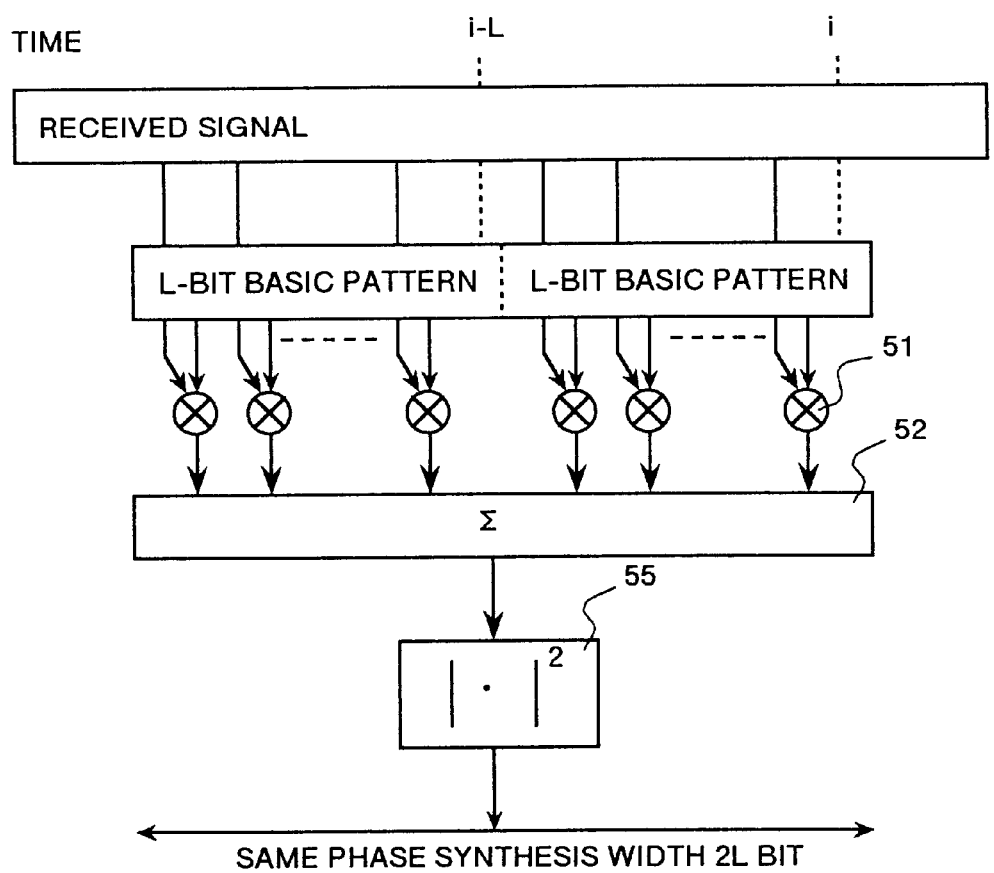
FIG. 13 shows the configuration of a power computing circuit according to the present invention and the correlator shown in FIG. 9.

FIG. 13 is a view showing configuration of a power computing circuit according to the present invention and the correlator shown in FIG. 9. This configuration shows a correlator for computing correlation to a known sequence with an entire sequence length of 2L assuming that a sequence length of a basic pattern is L bit, and a power computing circuit. Herein, a power computing circuit 55 computes a correlation power by multiplying a complex correlation power obtained through coherent synthesis over the length of 2L bit by the square thereof. In this case, a width of coherent synthesis requiring that change should not occur is 2L bit.

However, as a basic pattern, when auto-correlation characteristic in the basic pattern itself is completed like in the case of using the M sequence, for instance, in this embodiment, a correlation power for a correlation power in each basic pattern length L is computed respectively, and the correlation powers can be synthesized. Then, as phase information disappears in the synthesized correlation power, phase fluctuation between the correlation power to be synthesized can be allowed. With this feature, a width of coherent synthesis requiring such conditions that the auto-correlation characteristic of each basic pattern should be maintained and phase fluctuation should not occur is a basic pattern length.

Figure 14:
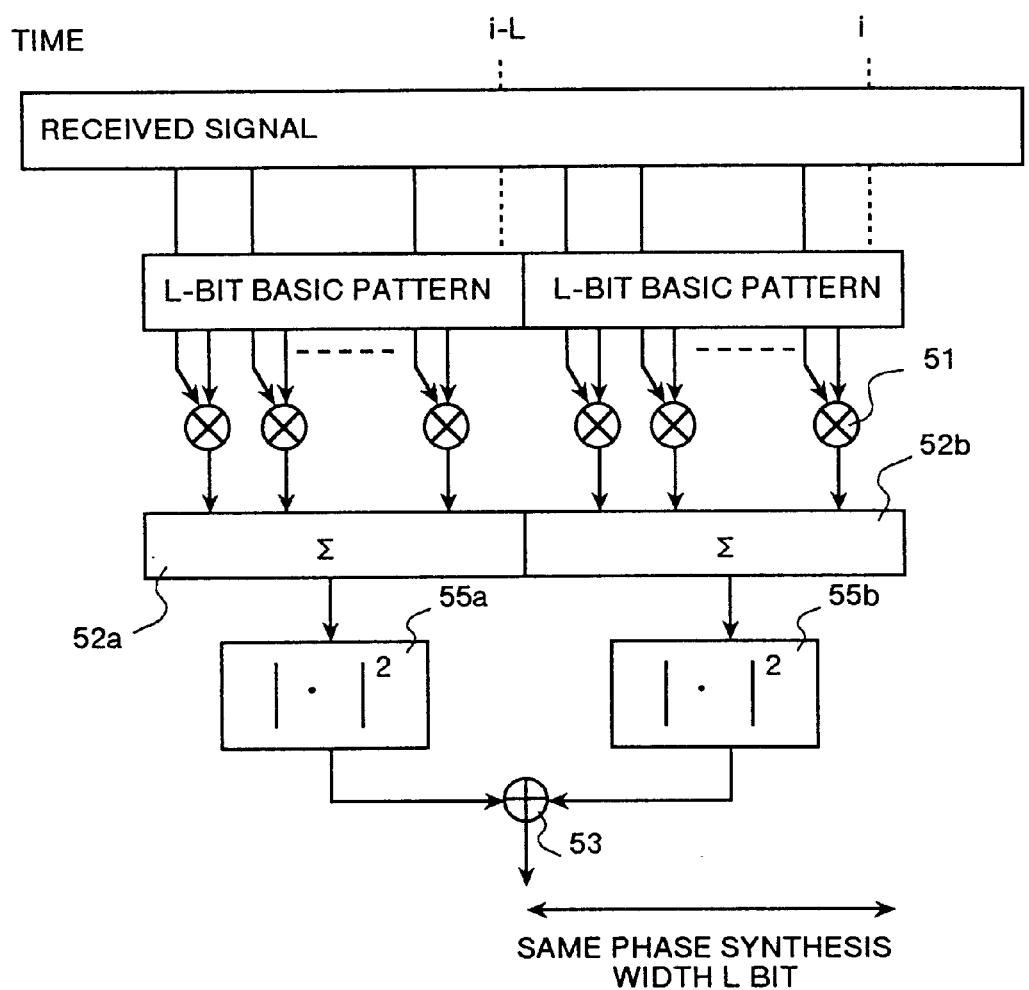
FIG. 14 is a view showing an application of the configuration of the power computing circuit according to the present invention and the correlator.

This configuration is shown in FIG. 14. In this example, each correlation power for a basic pattern is acquired by a correlator having an L-bit basic pattern at the timings i and i–L. This correlation power is squared in the power computing circuits 55a and 55b respectively to compute a correlation power for each basic pattern. Then, finally, a sum of correlation powers at the timings i and i–L is computed in the adder 53. With this operation, output from the adder 53 is based on synthesis with each power without phase information, therefore phase fluctuation is allowed at each timing i and i–L. Namely, a width of coherent synthesis requiring that phase fluctuation should not occur is L bit here.

When the configuration in this embodiment is applied to a correlator using the L-bit shift register in Embodiment 7, a value to be stored in the shift register is not a complex correlation power but a correlation power, which allows the size of the shift register to be suppressed to half of it.

For example, when a received signal changes with time or when large amount of noise is included in a received signal, correct bit timing may not be obtained by detection of bit timing performed once due to influence of fading and noise. Therefore, in the present invention, by using a bit timing synchronization device for a plurality of frames to average bit timing in time axis, characteristics can be improved.

Figure 15:
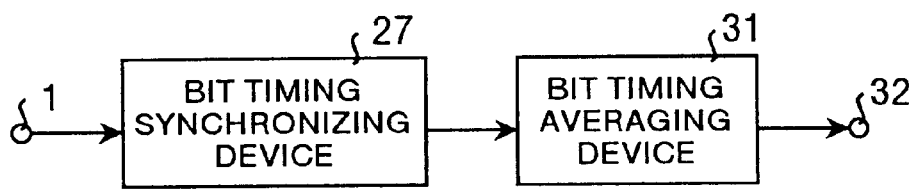
FIG. 15 is a block diagram showing an example of the configuration of a bit timing synchronization device according to Embodiment 9 of the present invention.
Figure 16:
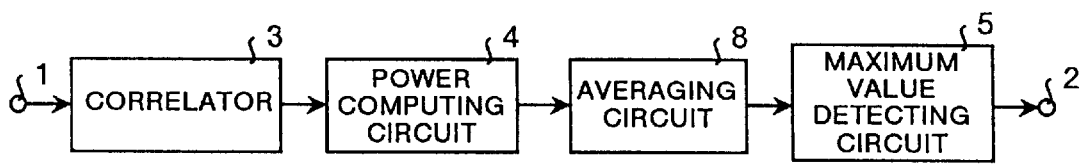
FIG. 16 is a block diagram showing an example of the configuration of a bit timing synchronization device based on the conventional technology.
Figure 17:
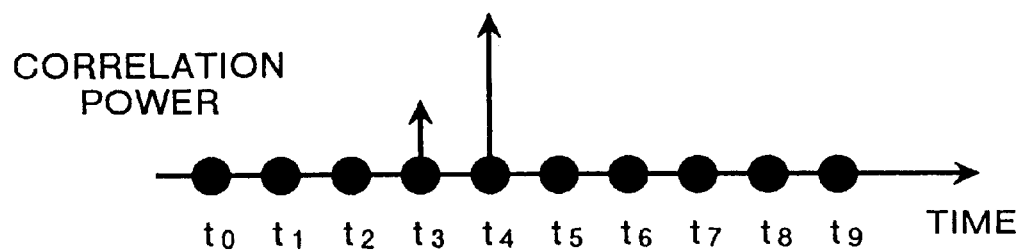
FIG. 17 is a view for explaining an operation of the bit timing synchronization device based on the conventional technology.
Figure 18:
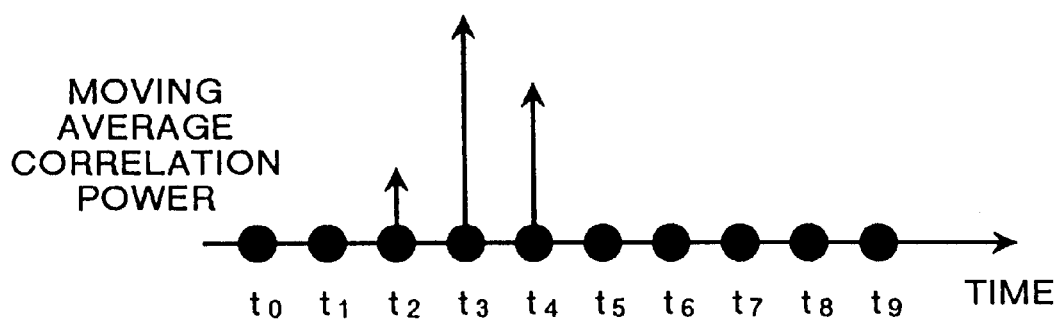
FIG. 18 is a view for explaining another operation of the bit timing synchronization device based on the conventional technology.
Figure 19:
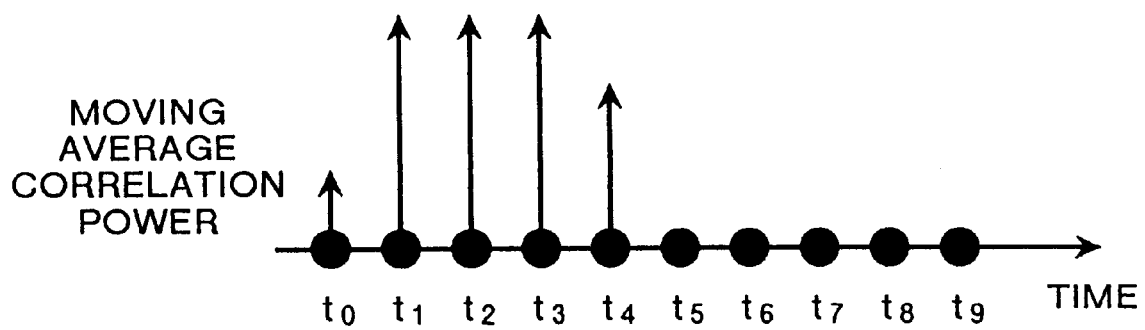
FIG. 19 is a view for explaining still another operation of the bit timing synchronization device based on the conventional technology.

FIG. 15 is a block diagram showing an example of configuration of a bit timing synchronization device according to Embodiment 9 of the present invention. Any configuration according to Embodiments 1 to 8 may be used as a bit timing synchronization device 27. At first, a received signal consisting of a plurality of continuous frames is inputted into an input terminal 1 of the bit timing synchronization device 27, and the bit timing is outputted from an output terminal of the bit timing synchronization device 27. This bit timing is inputted into a bit timing averaging device 31, and the bit timing averaging device 31 averages the bit timing using an interval at which a known sequence is repeated. Then, the bit timing averaging device 31 compares a result of this averaging to a prespecified threshold value and output a final bit timing through an output terminal 32.

More specifically, the bit timing averaging device 31 divides an output from the bit timing synchronization device 27 with the interval at which a known sequence is repeated, and adds divided output to one after another. Then, the bit timing averaging device 31 outputs timing for a result of the addition larger than the threshold value as optimal bit timing. With this operation, averaging of output from the bit timing synchronization device 27 can be realized and optimal bit timing can be computed.

Furthermore, the bit timing averaging device 31 may check, when bit timing is detected as output from the bit timing synchronization device 27, output afterward further by the interval at which the known sequence is repeated to the timing. At this point of time, when bit timing is detected in the following output, the timing is outputted as bit timing. Namely, the bit timing synchronization device 27 with this bit timing averaging device 31 provided therein outputs, when bit timing is detected n times in a row, for example, the detected value as optimal bit timing.

In this embodiment, although bit timing is averaged, averaging can be performed not only to the above timing but also to timing such as for a frame, a direct wave, and a delayed wave.

Although the present invention has been described with respect to Embodiments 1 to 9 for a complete and clear disclosure, the appended claims are not to be thus limited but are to be construed as embodying all modifications and alternative constructions that may occur to one skilled in the art which fairly fall within the basic teaching herein set forth.

In the present invention, a maximum value detecting means detects a maximum value of the correlation power within a pre-determined time-range. Then, a bit timing detecting means considers this detected timing corresponding to the maximum value of the correlation power as a tentative bit timing and further, detects a timing within the pre-determined time-range and prior to this tentative bit timing at which the correlation power is equal to or more than a correlation power is which can be set as desired as the bit timing for the operation of the demodulator. Thus, even if the power of the direct wave is smaller than the power of the delayed wave, bit timing for starting the operation of the demodulator can be detected from the timing of the direct wave. Therefore, with the device of present invention, it is possible to realize a high precision bit timing even in a channel having a wide delay spread.

In the present invention, a correlation between a received signal and a known sequence and the power of this correlation is computed. Then, a maximum value of the power within a pre-determined time-range and the timing corresponding to that maximum value of the power is computed. Timing within the pre-determined time-range is inverted to the past considering the timing corresponding to the maximum value of the power as the starting point. The correlation power successively outputted corresponding to the inverted timing is compared with a threshold value which is less that the maximum value, and a timing which timing is the oldest timing within the pre-determined time-range at which the value of the correlation power is larger than the threshold value is detected as the bit timing for starting the operation of the demodulator. Thus, even if the power of the direct wave is smaller than the power of the delayed wave, bit timing for starting the operation of the demodulator can be detected from the timing of the direct wave. Therefore, with the device of the present invention, it is possible to realize a high precision bit timing even in a channel having a wide delay spread.

In anothe r aspect of the present invention, noise in the correlation power is removed before detecting the maximum value of the correlation power. Therefore, with the present invention, influence due to noise can be suppressed.

In another aspect of the present invention, the threshold value used for comparison with the correlation power is set to a value obtained by multiplying the maximum value by 1/N where N is a natural number. Therefore, with the present invention, signals at the level of noise can be excluded.

In the present invention, a maximum value of the correlation power within a pre-determined time-range is detected. Then, this detected timing corresponding to the maximum value of the correlation power is considered as a tentative bit timing and further, a timing within the pre-determined time-range and prior to this tentative bit timing at which the correlation power is equal to or more than a threshold value which can be set as desired is detected as the bit timing for the operation of the demodulator. Thus, even if the power of the direct wave is smaller than the power of the delayed wave, bit timing for starting the operation of the demodulator can be detected from the timing of the direct wave. Therefore, with the method of the present invention, it is possible to realize a high precision bit timing even in a channel having a wide delay spread.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A bit timing synchronization device applied in a channel with intersymbol interference present therein for estimating bit timing for an operation of a demodulator according to correlation power, the bit timing synchronization device comprising:

a maximum value detecting unit for detecting a maximum value of the correlation power obtained within a pre-determined time-range; and a bit timing estimation unit for considering the timing at which said maximum value detecting unit detected the maximum value as a tentative bit timing, and estimating the bit timing within the pre-determined time-range, which is prior in time to the tentative bit timing, and at which the correlation power is equal to or greater than a threshold correlation power as the bit timing for the operation of the demodulator, wherein the threshold correlation power is optionally set as desired prior to estimating the bit timing.

2. A bit timing synchronization device according to claim 1 further comprising:

a noise removing unit for removing noise in the correlation power before processing by said maximum value detecting unit.

3. A bit timing synchronization device according to claim 1, wherein said bit timing estimating unit detects a timing within the pre-determined time-range and prior to the tentative bit timing at which the correlation power is equal to or greater than the threshold correlation power as the bit timing by using the tentative bit timing as a starting point.

4. A bit timing synchronization device according to claim 1, wherein the threshold correlation power is less than the maximum value detected by said maximum value detecting unit.

5. A bit timing synchronization device according to claim 1 further comprising:

a frame timing detecting unit for synchronizing a frame included in a received signal by comparing the correlation power outputted at each timing with a specified threshold value before processing by said maximum value detecting unit by detecting a timing at which the correlation power is equal to greater than the threshold value.

6. A bit timing detecting unit according to claim 5 further comprising:

a noise removing unit for removing noise before processing by said frame timing detecting unit.

7. A bit timing detecting unit according to claim 5, wherein said bit timing detecting unit detects a timing within the pre-determined time range and prior to the tentative bit timing at which the correlation power is equal to or greater than the threshold correlation power by using the tentative bit timing, wherein the tentative bit timing is used as a starting point.

8. A bit timing detecting unit according to claim 6, wherein correlation power is inputted into the bit timing estimating unit before removal of noise from the correlation power considering that the time zone using the tentative bit timing as the starting point is relatively small.

9. A bit timing detecting unit according to claim 7, wherein correlation power is inputted into the bit timing estimating unit before removal of noise from the correlation power considering that the time zone using the tentative bit timing as the starting point is relatively small.

10. A bit timing detecting unit according to claim 5, wherein the threshold correlation power is less than the maximum value detected by said maximum value detecting unit.

11. A bit timing detecting unit according to claim 1 further comprising:

a delayed wave timing estimating unit for estimating a timing of a latest delayed wave within the specified period of time, wherein the tentative bit timing is used as a starting point and detecting whether a timing within the pre-determined time range prior in time for which the correlation power is equal to or greater than the threshold correlation power is present or not after processing by said bit timing estimating unit.

12. A bit timing synchronization device according to claim 1, wherein an allowable range for a frequency deviation is enlarged by using a plurality of the bit timing synchronization devices each having at least said maximum value detecting unit and said bit timing estimating unit and further a plurality of phase rotating units each discretely located before each of said bit timing synchronization device for rotating and outputting a prespecified phase.

13. A bit timing synchronization device according to claim 1, wherein, when a known sequence previously set for computing correlation with a received signal including repetition of a basic pattern, the basic pattern is recognized as the known sequence, correlation power is computed from the received signal and from the basic pattern, and said maximum value detecting unit detects a maximum value of the correlation power.

14. A bit timing synchronization device according to claim 13, wherein durability against phase change is improved by reducing a zone for coherent synthesis for correlation according to the basic pattern.

15. A bit timing synchronization device according to claim 1 further comprising:

a bit timing averaging unit for timely averaging the bit timing for a plurality of frames estimated by said bit timing estimating unit.

16. A bit timing synchronization device applied in a channel with intersymbol interference present therein for estimating bit timing for an operation of a demodulator according to correlation power comprising:

a correlator for computing a correlation between a received signal and a known sequence;

a power computing circuit for computing a power of the correlation computed by said correlator;

a maximum value detecting circuit for detecting a maximum value of the power computed by said power computing circuit within a pre-determined time-range and the timing of the maximum value;

a time-reverse circuit for successively outputting correlation power within the pre-determined time-range by going back to previous timings from the timing corresponding to the maximum power detected by said maximum value detecting circuit; and a bit timing detecting circuit for comparing the maximum value detected by said maximum value detecting circuit with the correlation power successively outputted from said time-reverse circuit and then detecting a timing which timing is the oldest timing within the pre-determined time-range at which the value fo the correlation power is larger than a threshold value as the bit timing for starting an operation of said demodulator.

17. A bit timing synchronization device according to claim 16 further comprising:

an averaging circuit connected between an output terminal of said power computing circuit and an input terminal of said maximum value detecting circuit and an input terminal of said time-reverse circuit for computing a moving average of the power computed in said power computing circuit.

18. A bit timing synchronization method applied in a channel with inttersymbol interference present therein for estimating a bit timing for an operation of a demodulator according to correlation power comprising the steps of:

detecting a maximum value of the correlation power obtained within a pre-determined time range; and considering the timing at which said maximum value is detected as a tentative bit timing, and estimating the bit timing within the pre-determined time-range, which is prior in time to the tentative bit timing, and at which the correlation power is equal to or greater than a threshold correlation power as the bit timing for the operation of said demodulator.

19. A bit timing synchronization method according to claim 18 further comprising a step of:

removing noise from the correlation power before proceeding to the detecting step.

20. A bit timing synchronization method according to claim 18 further comprising a step of:

comparing the correlation power outputted at each timing with a specified threshold value before performing the step of detecting the maximum value, and then synchronizing frames included in a received signal by detecting a timing at which the correlation power is equal to or greater than the threshold value.

21. A bit timing synchronization method according to claim 20 further comprising a step of:

removing noise from the correlation power before performing the step of detecting the maximum value.

22. A bit timing synchronization method according to claim 18 further comprising a step of:

estimating a timing of a latest delayed wave within the specified period of time by detecting, by using the tentative bit timing as a starting point, whether a timing within the pre-determined time-range for which the correlation power is equal to or greater than the threshold correlation power is present or not after performing the step of estimating the bit timing.

* * * * *